324-77 SR
05-08-73 XR 3,732,405

United States Patent [19]

Stewart

[11] 3,732,405

[45] May 8, 1973

[54] APPARATUS FOR STATISTICAL TIME-SERIES ANALYSIS OF ELECTRICAL SIGNALS

[75] Inventor: Carrington H. Stewart, Houston, Tex.

[73] Assignee: The United States of America as represented by the Administrator of the National Aeronautics and Space Administration, Washington, D.C.

[22] Filed: Aug. 11, 1971

[21] Appl. No.: 170,681

[52] U.S. Cl. ..........235/151.31, 179/1 SA, 324/77 R, 324/78 J

[51] Int. Cl. ..........G06g 7/62

[58] Field of Search..........235/151.31, 150.53, 235/151.13, 92 TF; 179/1 SA, 1 SB, 1 VC, 1 VS; 340/148; 324/77 R, 77 A, 77 B, 77 G, 78 J, 78 Z

[56] References Cited

UNITED STATES PATENTS

| | | | |
|---|---|---|---|
| 3,413,546 | 11/1968 | Riehl et al. | 324/77 G |
| 3,549,877 | 12/1970 | Goldman | 235/151.13 X |
| 3,549,875 | 12/1970 | Goldman | 235/151.13 X |
| 3,546,584 | 12/1970 | Scarr | 179/1 SA |
| 3,621,388 | 11/1971 | Davis | 179/1 SA X |
| 3,592,969 | 7/1971 | Yoshino et al. | 179/1 SA |
| 3,530,243 | 9/1970 | Bezdel | 179/1 SA |

*Primary Examiner*—Malcolm A. Morrison
*Assistant Examiner*—Jerry Smith
*Attorney*—Marvin J. Marnock et al.

[57] ABSTRACT

An apparatus for performing statistical time-series analysis of complex electrical signal waveforms, permitting prompt and accurate determination of statistical characteristics of the signal.

9 Claims, 4 Drawing Figures

Carrington H. Stewart
INVENTOR.

BY

M. J. Mamock
ATTORNEY

Carrington H. Stewart
INVENTOR.

BY

M. J. Marnock
ATTORNEY

Carrington H. Stewart
INVENTOR.

BY

M. J. Marnock
ATTORNEY

APPARATUS FOR STATISTICAL TIME-SERIES ANALYSIS OF ELECTRICAL SIGNALS

ORIGIN OF THE INVENTION

The invention described herein was made by an employee of the United States Government and may be manufactured and used by or for the Government of the United States for governmental purposes without the payment of any royalties thereon or therefor.

BACKGROUND OF INVENTION

1. Field of the Invention

The present invention relates to apparatus and methods for performing analysis of electrical signals and waveforms.

2. Description of the Prior Art

In the prior art, several techniques or approaches were used in analysis of complex signals and waveforms, such as time domain analysis, frequency domain analysis, and combinations of these two types of analysis.

When the electrical signals waveform being analyzed was an electrical representation of speech in performing speech analysis and synthesis, a method known as the "machine syllable" method was used. In the "-machine syllable" technique, brief components of the speech occurring during transitions between voiced and unvoiced sounds in the speech were compared with samples of typical speech components, known as "-machine syllables" in order to categorize and analyze the input signal.

Each of these methods and techniques suffered from shortcomings. For example, several of these techniques required complex analysis equipment and facilities such as computers. Further, the "machine syllable" method did not operate in real time, but rather compared the speech components being analyzed with numerous stored "machine syllables" making the method time consuming. Further, accurate determination of the transitions between voiced and unvoiced sounds in speech using these methods was often difficult to achieve. Also, techniques using frequency domain analysis required complex and expensive bandpass filters and circuitry, while techniques using time domain analysis were often inaccurate and inprecise, particularly in sensing transitions between voiced and unvoiced sound in speech.

SUMMARY OF INVENTION

In the present invention, it has been determined that simple, rapid, and accurate analysis of complex electrical signal waveforms can be performed by determining the difference between the frequency of the incoming signal waveform during the interval between two zero crossings, hereinafter referred to in the description and claims as the instantaneous frequency, and the average frequency of the signal, and further by generating statistical moments regarding such difference.

Statistical moments are formed by raising the difference between instantaneous frequency and the average frequency to the second, third, fourth, and higher powers. Statistical moments are used to determine and emphasize the transition between voiced sound, unvoiced sounds, and phonemes occurring in human speech. Thus, with the present invention, occurrence of unvoiced sounds in speech, which are largely determinative of the intelligibility of the speech, can be more rapidly and accurately determined, permitting more rapid speech processing and recognition in speech analysis and synthesis systems and in voice compression systems used to reduce voice signal bandwidth.

It is an object of the present invention to provide a new and improved method and apparatus for statistical analysis of electrical signals.

DESCRIPTION OF PREFERRED EMBODIMENT

Figure 1:
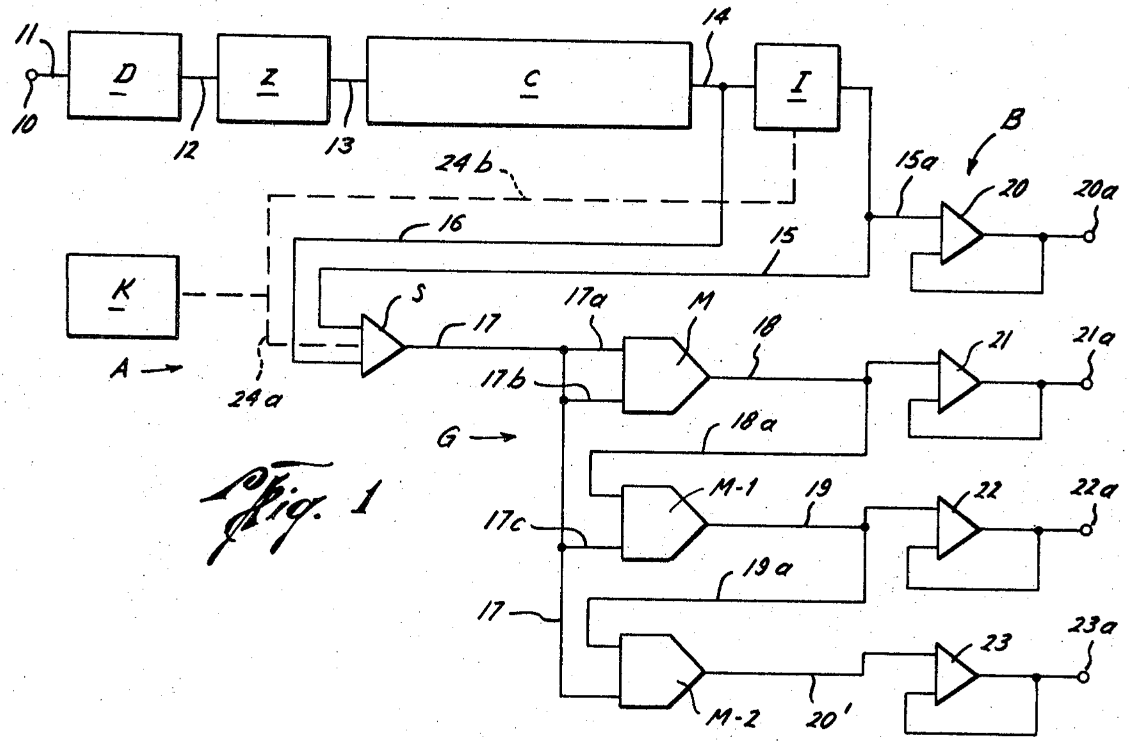
FIG. 1 is a schematic functional block diagram of the apparatus of the present invention.

In the drawings, the letter A designates generally the apparatus of the present invention used for statistical time-series analysis and investigation of electrical signals to determine changes, transitions and the like in the signal. Particularly, the apparatus A of the present invention may be used to perform statistical time-series analysis of, and determine and emphasize transitions between voiced sounds, phonemes, and unvoiced sounds in speech. Thus, occurrence of unvoiced sounds in speech, which are largely determinative of the intelligibility of the speech, can be more readily determined in order to permit more rapid speech processing and recognition in speech analysis and synthesis systems and in voice compression systems used to reduce voice signal bandwidth.

The apparatus A (FIG. 1) receives an input signal at an input terminal 10 which is an electrical representation of a complex input signal. The input signal is conveyed from the input terminal 10 over a conductor 11 to a differentiator D which differentiates the incoming signal in order to emphasize and sense high frequency or rapidly-changing portions of the input signal.

An electrical conductor 12 conveys the differentiated input signal from the differentiator D to a zero-crossing detector Z which provides a square wave output signal with pulses thereof in such output signal indicating the duration or time period between successive signal level transitions, or zero crossings, of the electrical signal present on the conductor 12. It should be understood that the zero-crossing detector Z may be used to sense other signal level transitions or threshold crossings instead of zero crossings, depending on the nature of the signal present on the conductor 12, as desired.

The square wave output signal from the zero-crossing detector Z is provided over an electrical conductor 13 to a frequency to amplitude converter C which computes the instantaneous frequency of the input signal by forming an output signal corresponding in amplitude to the frequency of the signal present on the conductor 13.

An integrator circuit I receives the output from the converter C over a conductor 14 and computes the average frequency of the signal by integrating such signal over a period of time. An electrical conductor 15 transmits the signal indicating the average frequency of the input signal from the integrator I to a subtractor S. The subtractor S also receives a signal indicating the instantaneous frequency of the input signal, during the interval between two zero-crossings of the input signal, over an electrical conductor 16 from the output of the converter C. The subtractor S forms an output signal indicative of the difference between its two input signals, the instantaneous frequency of the input signal and the average frequency, known as the first statistical moment of the instantaneous frequency. The output signal from the subtractor amplifier S is furnished over an electrical conductor 17 to a moment generating network G wherein higher statistical moments of the instantaneous frequency of the signal with respect to the average frequency of the signal are generated in order that the input signal may be analyzed to permit prompt and accurate analysis of the complex input signal waveform.

The moment generating network G includes an analog multiplier M, an analog multiplier M–1, and an analog multiplier M–2. The analog multiplier M receives as an input signal from an input conductor 17*a* and an input conductor 17*b* the output of the subtractor S and squares, or multiplies the output signal from the subtractor S by itself, in order to square the output signal representing the first statistical moment or difference between the instantaneous frequency of the input signal and the average frequency. The squaring or multiplication by the multiplier M generates and forms a second statistical moment of the input signal which is provided to an output conductor 18.

The analog multiplier M–1 receives the output signal from the subtractor S over an input conductor 17*c* and also receives the output signal from the analog multiplier M over an input conductor 18*a*. The analog multiplier M–1 multiplies the electrical signals present on the input conductor 17*c* and 18*a* with each other, and thus cubes, or raises to the third power, the output of the subtractor S, forming and generating a third statistical moment of the instantaneous frequency of the input signal with respect to the average frequency of such signal. The third statistical moment formed in the analog multiplier M–1 is provided to an output conductor 19 and over a conductor 19*a* to the analog multiplier M–2.

The analog multiplier M–2 receives the third statistical moment from the analog multiplier M–1 over the conductor 19*a* and also receives the output of the subtractor S over the conductor 17 and multiplies such signals with each other in order to raise the difference between the instantaneous frequency of the input signal and the average frequency of such signal to the fourth power, forming a fourth statistical moment of the instantaneous frequency of the input signal. The fourth statistical moment formed in the analog multiplier M–2 is provided to an output conductor 20'.

An isolating or buffer amplifier section B receives the output of the integrator I and the analog multipliers M, M–1, and M–2 in order to isolate and amplify such output signals and provide such signals to a suitable monitoring means, which may be for example an oscilloscope, a recording tape, a computer display or other suitable data display means for analysis, inventigation and study of the input signal for determining changes, transitions, and the like in the signal, as has been previously set forth.

The buffer amplifier section B includes a voltage follower operational amplifier 20 receiving the output of the integrator I over an input conductor 15*a* and providing a buffered output signal over an output terminal 20*a* to the data display means previously set forth. In a like manner, a voltage follower operational amplifier 21, a voltage follower operational amplifier 22, and a voltage follower operational amplifier 23, receive the outputs from the analog multipliers M, M–1, and M–2, respectively, over the output electrical conductors 18, 19, and 20, respectively, and provide separate output signals of such multipliers over an output terminal 21*a*, an output terminal 22*a* and an output terminal 23*a*, respectively, to the data display means previously set forth.

Figure 2:
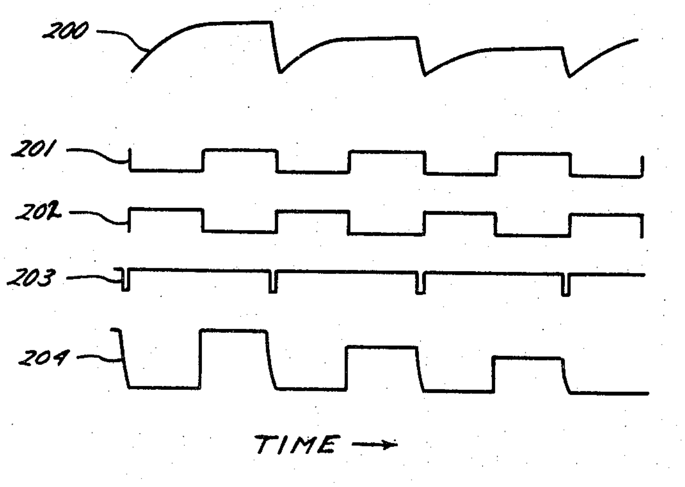
FIG. 2 is a signal waveform diagram of signals present in the apparatus of FIG. 1.

A control and timing circuit K forms and provides timing and control signals (FIG. 2), in a manner to be more evident hereinbelow, to the subtractor S as indicated by the dashed line 24*a* (FIG. 1), and to the integrator I as indicated by the dashed line 24*b*.

Figure 3:
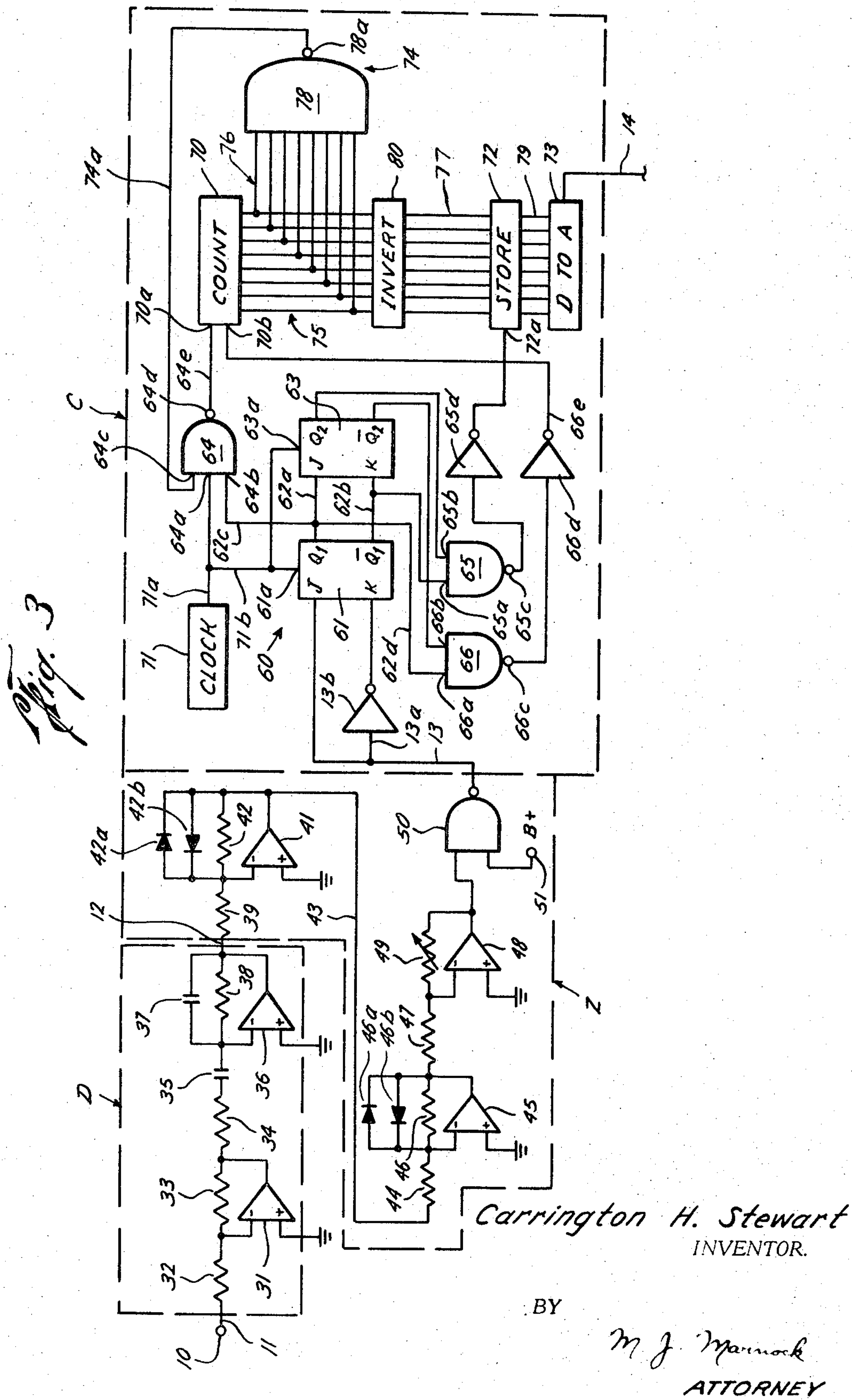
FIGS. 3 and 4 are schematic electrical circuit diagrams of the apparatus of FIG. 1.

Considering the apparatus A more in detail (FIGS. 3 and 4), the differentiator D (FIG. 3) includes a buffer operational amplifier 31 which receives the input signals from the input terminal 10 and conductor 11 through an input resistor 32 at a negative input terminal thereof. A feedback resistor 33 electrically connects the output of the amplifier 31 to the negative input terminal to limit the gain of the amplifier 31 to the desired amount. A coupling resistor 34 electrically connects the output of the amplifier 31 to a capacitor 35 of a differentiating operational amplifier 36. A feedback capacitor 37 and a feedback resistor 38 are electrically connected in a parallel circuit between the output of the differentiating operational amplifier 36 and a negative input terminal of the amplifier 36 and together with the capacitor 35 and the amplifier 36 form a differentiating network, providing a time derivative of the signal supplied to the capacitor 35 through the coupling resistor 34 from the amplifier 31.

The differentiated output of the operational amplifier 36 of the differentiator D is provided over the conductor 12 to a coupling input resistor 39 of the zero-crossing detector Z. Thus, the differentiator D receives the input signal from the input terminal 10 and forms a time derivative of such input signal, thereby emphasizing the rapidly-changing, or high-frequency, components of the input signal in order to permit prompt and accurate analysis of transitions and levels in the input signal, particularly when such input signal is an electrical representation of human speech. In this manner, transitions between voiced sounds, unvoiced sounds, and phonemes may be rapidly determined with the apparatus A of the present invention. The time differential of the input signal is then fed to the zero-crossing detector Z.

The zero-crossing detector Z receives the differentiated output signal from the differentiator D and forms an output square wave. The duration of the pulses in the output square wave from the zero-crossing detector Z indicates the time duration between signal level transitions, threshold or zero-signal-level crossings in the output of the differentiator D.

The input resistor 39, which provides the output from the differentiator D to a first clipper operational amplifier 41 at a negative input terminal thereof, and a feedback resistor 42 connected between an output of the operational output amplifier 41 and the negative input terminal thereof, control and limit the gain of the amplifier 41.

A pair of diodes 42*a* and 42*b* are electrically connected in parallel with the feedback resistor 42 between the output of, and the negative input of, the operational amplifier 41 and clip and limit the amplitude of the output signal of the amplifier 41 in order to clip and limit and prevent excessively large output voltage amplitude variations in the output of the amplifier 41, and to square or clip the input signal furnished to the zero-crossing detector Z from the differentiator D. The output of the clipper operational amplifier 41 is provided over an electrical conductor 43 and input resistor 44 to a negative input terminal of a second clipper operational amplifier 45.

A feedback resistor 46 electrically connects the output of the clipper operational amplifier 45 with the negative input terminal and in conjunction with the input resistor 44 limits the gain and the output of the clipper operational amplifier 45 to provide square wave pulses at the output thereof. A pair of the diodes 46*a* and 46*b* are electrically connected in parallel with the feedback resistor 46 and clip and reduce or limit voltage amplitude surges in the output of the amplifier 45 in order to further assist in forming a square wave in the zero-crossing detector Z.

An input resistor 47 provides the square wave output of the second clipper operational amplifier 45 to a negative input terminal of a buffer operational amplifier 48. A variable resistor 49 is electrically connected between an output terminal and the negative input terminal of the operational amplifier 48 and is varied and adjusted in order that the resistor 49 and the input resistor 47 limit the output gain of the amplifier 48 to the desired level in order to match the desired voltage logic levels required for operation of an inverting NAND gate 50.

The NAND gate 50 receives a positive logic level from a positive power supply terminal 51 and accordingly inverts the output of the operational amplifier 48 and provides the square wave output signal from the zero-crossing detector Z to the frequency to amplitude converter C, with the duration or width of the square wave output pulses of the NAND gate 50 varying in duration in accordance with the time between zero crossings or signal level transitions in the output signal from the differentiator D.

The frequency to amplitude converter C receives as an input signal over the conductor 13 the square wave output signal from the zero-crossing detector Z. As has been previously set forth, the time duration, or period, of the pulses in the square wave output signal from the zero-crossing detector Z are determined by the time duration between zero crossings or signal level transitions in the input signal to the input terminal 10 and differentiator D. The converter C receives the square wave input pulses and forms an output signal varying in amplitude in accordance with the inverse of the time duration or period, the frequency, of the output square wave signal from the zero-crossing detector Z. The output signal whose amplitude indicates the instantaneous frequency of the input signal furnished to the converter C is furnished to the integrator I and the subtractor S over the output conductor 14, as has been previously set forth.

The converter C (FIGS. 1 and 3) includes a control circuit 60 which responds to the input signal level transitions, and controls an eight-bit binary counter 70, permitting the counter 70 to count the clock pulses generated by a high-speed clock 71. An eight-bit storage register 72 stores the output count of the binary counter 70 and presents the stored output count to a digital-to-analog converter 73. The converter 73 produces an output signal corresponding in amplitude to the output count of the binary counter 70, thus providing an output signal whose amplitude indicates the duration between signal level transitions, and consequently the frequency, of the input signal. A limiting circuit 74 controls the binary counter 70 in response to a predetermined output count from the binary counter 70 and provides a frequency limit for conversion of the input frequency into a corresponding output amplitude by the converter C.

The control circuit 60 is electrically connected by the conductor 13 to the zero-crossing detector Z, as previously set forth. The input conductor 13 is electrically connected to a J input of a J-K flip-flop 61 of the control circuit 60. An electrical conductor 13*a* applies the input signal on the input conductor 13 to an inverter 13*b*, whose output is furnished over an electrical conductor to a K input of the J-K flip-flop 61.

A $Q_1$ output terminal of the flip-flop 61 provides an output signal of corresponding polarity to the input signal applied at the J input terminal. When the flip-flop 61 is energized by a clock pulse from the clock 71 at a clock pulse input terminal 61*a*, the flip-flop 61 transfers the input signal from the J input terminal to the $Q_1$ output terminal. The $Q_1$ output terminal remains at the level of the transferred signal during the interval until the next clock pulse is present at the terminal 61*a* and provides a voltage waveform over an electrical conductor 62*a* to a J input terminal of a second J-K flip-flop 63.

A $\overline{Q}_1$ output terminal of the flip-flop 61 provides an output signal corresponding to the input signal appearing at the K input terminal of the flip-flop 61. The input signal is transferred from the K input terminal to the $\overline{Q}_1$ output terminal when the flip-flop 61 is energized by a clock pulse appearing at the clock pulse input terminal 61*a*. The $\overline{Q}_1$ output terminal maintains the level of the transferred signal until receipt of the next clock pulse at the terminal 61*a* and provides a voltage waveform which is furnished by an electrical conductor 62*b* to a K input terminal of the second J-K flip-flop 63.

A $Q_2$ output terminal of the second J-K flip-flop 63 provides an output signal corresponding to the input signal appearing at the J input terminal of the flip-flop 63. The input signal is transferred when the flip-flop 63 is energized by a clock pulse from the clock 71 at a clock pulse input terminal 63*a*, providing a voltage waveform at the $Q_2$ output terminal. A $\overline{Q}_2$ output terminal provides an output signal waveform of like polarity to the input signal appearing at the K input terminal of the flip-flop 63. The input signal at the K input is transferred when the flip-flop 63 is energized by a clock pulse at the clock pulse input terminal 63*a*.

The high-speed clock or oscillator 71 produces a square wave voltage output waveform over an electrical conductor 71*a* to an electrical conductor 71*b* which is electrically connected to the clock pulse input terminals 61*a* and 63*a* of the flip-flops 61 and 63, respectively, to insure synchronized operation of the clock 71 and the flip-flops 61 and 63. The electrical conductor 71a is also electrically connected to a first input 64*a* of the 3-input NAND gate 64 of the control circuit 60. The NAND gate 64, when energized in a manner to be set forth hereinbelow, permits the clock pulses from the high-speed clock 71 to drive the 8-bit binary counter 70. The output count of the counter 70 represents the number of clock pulses produced by the high-speed clock 71 while the NAND gate 64 of the control circuit 60 permits such pulses to pass during an input square-wave pulse which the zero-crossing detector Z formed in response to axis crossings of the input signal waveform, in the manner previously set forth.

A second input terminal 64*b* of the gate 64 is electrically connected by a conductor 62*c* to the conductor 62*a* and receives over such conductors the output signal present at the $Q_1$ output terminal of the flip-flop 61. A third input terminal 64*c* of the gate 64 receives an output signal from the limit circuit 74 over an electrical conductor 74*a*. The electrical signal over the conductor 74*a* is normally a logical "1," and consequently when the $Q_1$ terminal of the flip-flop 61 is a logical "1," an output terminal 64*d* of the gate 64 provides a voltage waveform of opposite polarity or logic level to the square wave clock pulse voltage waveform appearing over the conductor 71*a* at the input terminal 64*a*. The voltage waveform appearing at the output 64*d* of the gate 64 is furnished over an electrical conductor 64*e* to an input terminal 70*a* of the eight-bit binary counter 70.

The eight-bit binary counter 70 receives the input signal at the terminal 70*a* and accumulates a binary output count of the number of such pulses. The individual bits of the binary output count are presented at a plurality of output conductors 75 indicating the number of clock pulses produced by the clock 71 while the converter C is enabled by the control circuit 60. The binary counter 70 counts the pulses in the waveform appearing at the input terminal 70*a* until the flip-flop 61 of the control circuit 60 changes state in response to a change of state in the input signal from the zero-crossing detector Z. The logical "0" output at the $Q_1$ output terminal disables the control circuit 60 by providing a logical "0" signal to the input terminal 64*b* of the gate 64, preventing the passage of subsequent clock pulses through the gate 64 to the counter 70.

The limiting circuitry 74 senses the output count of the binary counter 70 present on the conductors 75 by a plurality of input conductors 76 each of which is individually connected to one of the output conductors 75. The limit circuit 74 provides a logical "0," in a manner to be set forth hereinbelow, when a predetermined output count of the binary counter 70, corresponding to the passage of a predetermined length of time between zero crossings of the input signal, is reached. This length of time is a predetermined maximum period, and thus a minimum frequency limit, of the input signal from the zero-crossing detector Z.

An eight-input NAND gate 78 is electrically connected to each of the conductors 76 at its eight input terminals. When the output count of the binary counter 70 reaches decimal 255, or binary 11111111, an output terminal 78*a* of the NAND gate 78 is driven to a logical "0" prior to a change of state of the first flip-flop 61. The logical "1" present on each of the input conductors 76 will cause the output signal appearing at an output terminal 78*a* of the NAND gate 78 to become a logical "0." This logical "0" is conveyed by the conductor 74*a* to the input terminal 64*c* of the gate 64, driving the output terminal 64*d* of the gate 64 to a logical "1," disabling the binary counter 70. Subsequent clock pulses from the clock 71 thus do not pass through the gate 64, and the output count from the counter 70 remains at the predetermined output count.

The lower frequency limit for conversion of the input frequency into an output amplitude may be established at other suitable predetermined frequencies by adjusting the frequency of the high-speed clock 71, or by adjusting the predetermined output count of the binary counter 70 to a predetermined number by the selective inclusion of inverters in preselected ones of the electrical conductors 76 to adjust the predetermined count to drive terminal 78*a* of the limiting circuitry 74 to a logical "0." The output count of the binary counter 70 may also be adjusted to a predetermined count by selectively increasing or decreasing the capacity of the binary counter 70 above or below eight bits.

For example, should it be desired to reduce the lower frequency limit for conversion of the input frequency into an output amplitude in the converter C by one-half, the frequency of the high-speed clock 71 could be reduced by one-half, the capacity of the binary counter 70 could be reduced from eight bits to seven bits, or an inverter of like construction and function to the inverter 13*b* could be electrically connected with the conductor 75 providing the most significant bit output from the counter 70 to the NAND gate 78. The lower limit frequency may thus be adjusted to provide a desired lower frequency limit for conversion of the input signal frequency into an output amplitude.

The storage circuit 72 includes a storage register of like bit capacity to the binary counter 70. The storage register includes a plurality of flip-flops or other suitable binary memory devices for storing the output count of the binary counter 70 when energized by a storage register store pulse which is formed in a manner to be more evident hereinbelow. The storage register 72 receives the output count from the counter 70 through the inverters 80 and a plurality of conductors 77 and presents the output count to the digital-to-analog converter 73 over a plurality of output conductors 79. A plurality of inverters 80 are connected between the output conductors 75 and the inputs to the individual binary memory devices in the storage register 72. The inverters 80 invert the logical level of the output count from the binary counter 70 and convert a high binary count, caused by a long duration or low frequency input signal, to appear at the inputs to the storage register 72 as a small output count. In a like manner, a low binary output count of the binary counter 70 formed during a short duration or high-frequency input signal will be inverted by the inverters 80 and appear at the input to the storage register 72 as a high output count. Thus, the inverters 80 cause the magnitude of the binary output count furnished by the storage circuit 72 on the output electrical conductors 79 to be in a direct relation to the frequency of axis crossings of the input signal from the zero-crossing detector Z.

The digital-to-analog converter 73 is responsive to the binary output count present on the conductors 79 and converts such binary count into an output analog signal corresponding in amplitude to the digital output count stored in the storage register 72, producing an output signal whose amplitude indicates the duration between axis crossings of the input signal furnished over the conductor 13 from the zero-crossing detector Z. Any digital-to-analog converter of the well-known type which converts an input binary signal into an output analog signal may be used as the converter 73 in the frequency to amplitude converter C.

The conductor 14 is connected to the output terminal of the digital-to-analog converter 73 and provides the output signal of the digital-to-analog converter 73, whose amplitude corresponds to the input signal frequency, to the inverter I and the subtractor S, as will be more evident hereinbelow.

A NAND gate 65 is connected at a first input terminal 65*a* by an electrical conductor to the electrical conductor 62*b* to receive the $\overline{Q}_1$ output of the flip-flop 61. A second input terminal 65b of the NAND gate 65 is electrically connected by a conductor to the $Q_2$ output of the flip-flop 63.

For the duration of one cycle of the output of the clock 71 when the flip-flop 61 changes state until the flip-flop 63 changes state in response to the input signal, the output signal at an output terminal 65*c* of the NAND gate 65 is a logical "0" due to a logical "1" at both input terminals 65*a* and 65*b*. The logical "0" is inverted by an inverter 65*d*, producing a storage register store pulse which is fed to a read-in or strobe input 72*a* of the storage register 72. The storage register store pulse energizes the memory devices in the storage register 72 and initiates transfer of the output count of the counter 70 present on the conductors 75 into the storage register 72. The storage register 72 presents the stored output count over the conductors 79 to the digital-to-analog converter 73 for conversion of the output count into an output signal whose amplitude indicates the duration between axis crossings of the input signal.

A counter clear NAND gate 66 is electrically connected at a first input terminal 66*a* to the $Q_1$ output terminal of the flip-flop 61 by an electrical conductor 62*d*. A second input terminal 66*b* of the NAND gate 66 is connected by a conductor to the $\overline{Q}_2$ output of the flip-flop 63. For the duration of one cycle of the high-speed clock 71 when the flip-flop 61 changes state in response to a change in the input from the zero-crossing detector Z until the flip-flop 63 changes state in response to the change of state of the flip-flop 61, an output terminal 66*c* is driven to a logical "0" by a logical "1" present at both input terminals 66*a* and 66*b*. The logical "0" signal is conducted by a conductor to an inverter 66*d*, which converts the logical "0" into a logical "1," forming a counter clear pulse which is furnished over an electrical conductor 66*e* to a counter clear input terminal 70*b* of the binary counter 70. When the binary counter 70 receives the counter clear pulse at the input terminal 70*b*, the binary counter 70 is reset to a decimal 0 or a binary "00000000." The output count of the binary counter 70 is reset and the counter 70 is prepared for a new cycle of counting at the proper initial count.

Thus, it can be seen that the converter C of the present invention receives square-wave input pulses from the zero-crossing detector Z whose duration indicates the time between zero crossings of the input signal at the input terminal 10. The converter C receives such square-wave input pulses and provides an output signal over an output conductor 14 whose amplitude indicates the inverse of the time duration of such input pulses, or the frequency of such input pulses. The output connector 14 provides the signal whose amplitude indicates the frequency of the input signal of the terminal 10 to the integrator I and to the subtractor S for further processing of such signal by the apparatus A of the present invention, as will be more evident hereinbelow.

A voltage follower operational amplifier 101 (FIG. 4) with an electrical feedback conductor 101*a* connecting an output terminal thereof with a negative input terminal thereof receives the output signal from the converter C and furnishes such signal over the conductor 16 to the subtractor S (FIG. 4) and to a resistor 102 of the integrator I. The resistor 102 and integrating capacitor 103 provide the integrating action of the integrator I.

An analog gate 104 comprising the amplifier 104*b* and the field effect transistor 104*f* receives control pulses from the control circuit K (FIG. 4) and permits analog signals to pass from the resistor 102 to the integrating capacitor 103 of the integrator I. An input terminal 104*a* receives an integration control signal waveform 201 (FIG. 2) from the control circuit K as indicated by the dashed line 24*b* (FIGS. 1 and 4) and furnishes the control signal 201 through the amplifier 104*b* to a control terminal 104*c* of the field effect transistor 104*f*. When the control signal 201 is furnished to the control terminal 104*c*, the analog signal from the resistor 102 is permitted to pass from an input terminal 104*d* of the field effect transistor 104*f* through an output terminal 104*e* and to the integrating capacitor 103.

The integrator I receives the output signals from the converter C and integrates and accumulates same in order to provide an integrator output signal waveform 200 (FIG. 2) indicative of the average output of the converter C and in turn indicative of the average input frequency of the input signal present at the input terminal 10 of the apparatus A.

An integrator reset analog gate 105 comprising the amplifier 105*b* and the field effect transistor 105*f* receives an integrator reset control signal waveform 203 (FIG. 2) from the control circuit K as indicated by the dashed line 124*b* and provides the signal 203 of the control terminal 105*c* of the field effect transistor 105*f*. When the input signal 203 is present at the terminal 105*a* an electrically conductive path to ground is provided through an input terminal 105*d* and an output terminal 105*e* of the field effect transistor 105*f*. When the conductive path is formed between the input terminal 105*d* and the output terminal 105*e*, the charge which has accumulated on the integrating capacitor 103 during the operation thereof is permitted to flow to ground through the field effect transistor 105*f*, clearing and resetting the integrating capacitor 103 and the integrator I for another cycle of operation.

A voltage follower operational amplifier 106, with an electrical feedback conductor 106*a* connecting an output terminal with a negative input terminal thereof in order to provide voltage follower or buffer action in the operational amplifier 106, electrically connects the integrating capacitor 103 of the integrator I with an input resistor 107*a* of the first gain adjusting or scaling operational amplifier 107. A feedback resistor 107*b*, electrically connected between an output terminal and a negative input terminal of the operational amplifier 107, and the input resistor 107*a* control and adjust the amplitude of the output signal from the integrator I as amplified by the operational amplifier 107.

An input resistor 108*a* of a second scaling or gain adjusting operational amplifier 108 receives the output from the first scaling operational amplifier 107 and provides such signal to the operational amplifier 108. A variable resistance 108*b* is electrically connected between an output terminal and a negative input terminal of the scaling operational amplifier 108, and in conjunction with the input resistor 108*a* controls and adjusts the gain of the scaling operational amplifier 108 in order to regulate the amplitude of the signal furnished from the integrating capacitor 103 to the subtractor S by the electrical conductor 15.

Thus, it can be seen that the integrator I receives an input signal from the electrical conductor 14 whose amplitude indicates the frequency of the input signal presented to the apparatus A of the input terminal 10, and integrates and accumulates such signal in order to provide an output signal over the conductor 15 to the subtractor S for further processing and over the conductor 15a to the buffer operational amplifier 20 to indicate the average frequency of the input signal to the apparatus A.

The control circuit K includes a first clock 110 and a second clock 111 providing control and timing signals (FIG. 2) to the integrator I and the subtractor S as has been previously set forth. The clock 110 provides pulses of a suitable frequency to insure discharge of the integrating capacitor 103, as will be more evident hereinbelow, through a clamping diode 110*a* to a clock pulse input 112*a* of a control J-K flip-flop 112.

The clock 111 provides clock pulses of a frequency chosen to be a submultiple of a suitable period over which the incoming input signal is stationary. For example, when the incoming input signal is speech, a submultiple of 15 milliseconds is suitable as a period of the signal from the clock 111. For example, a frequency of 134 hertz is suitable for use of the clock 111. The clock 111 provides the output signal through a clamping diode 111a and an inverter 111*b* to a J input of the J-K flip-flop 112.

An output terminal of the inverter 111*b* provides an integrator transfer control signal wave form 202 (FIG. 2) as indicated by the dashed line 24*a* (FIG. 4), to the subtractor S in order to control the operation thereof, as will be more evident hereinbelow. The output of the inverter 111*b* is supplied through an inverter 113 to a K input of the J-K flip-flop 112.

The inverter 113 furnishes an integrator control signal wave form 201 (FIG. 2), as indicated by the dashed line 24*b* (FIG. 4), to the analog gate 104 in the integrator I in order to permit incoming signals on the conductor 14 to be stored in the integrating capacitor 103, as has been previously set forth.

A first input terminal 115*a* of a NAND gate 115 receives the output of the inverter 111*b*. A second input terminal 115*b* of the NAND gate 115 is electrically connected by a conductor 115*c* to a $\overline{Q}$ output terminal of the J-K flip-flop 112. The NAND gate 115 forms the integrator reset control signal wave form 203 (FIG. 2) at the time of a transition of the integration control signal 202 and the integration transfer signal 201, as is evident from FIG. 2.

The integration reset control signal wave form 203 is furnished to the analog gate 105, as indicated by the dashed line 124*b* (FIG. 4) in order to discharge and reset the integrating capacitor 103 preceding a new integration cycle in the integrator I.

The subtractor S (FIG. 4) receives the output of the integrator I representing the average frequency of the input signal over the conductor 15 and the output of the converter C from the amplifier 101 and conductor 16 and determines the difference between the instantaneous frequency and the average frequency of the input signal, as has been previously set forth.

An analog gate 130 (FIG. 4) comprising an amplifier 130*b* and a field effect transistor 130*f* of the subtractor S receives the integration transfer control signal waveform 202 (FIG. 2), as indicated by the line 24*a* (FIG. 4) at an input terminal 130*a*. The wave form 202 is furnished by an amplifier 130*b* of the analog gate 130 to a control terminal 130*c* of the field effect transistor 130*f* energizing the analog gate 130 and permitting the waveform 200 representing the output of the integrator I present on the conductor 15 to pass from an input terminal 130*d* to an output terminal 130*e* during the negative half cycle of the waveform 202. The conductor 15*a* electrically connects the output terminal 130*e* of the field effect transistor 130*f* to a positive input terminal of the buffer operational amplifier 20 in order to isolate and buffer the output of the integrator I. The operational amplifier 20 provides a transformed integrator output signal 204 at the output terminal 20*a* whose amplitude indicates the average frequency of the input signal for connection with a suitable monitoring and test instrument, as has been previously set forth. Further, as has been previously set forth, the output signal 204 is furnished to the moment generating network G to form statistical moments of the instantaneous frequency of the input signal for analysis and study of such input signal.

An input resistor 133*a* of a subtractor operational amplifier 133 of the subtractor S electrically connects the output terminal 130*e* of the field effect transistor 130*f* to a negative input terminal of the operational amplifier 133. A feedback resistor 133*b* electrically connects the output terminal of the amplifier 133 to the negative input terminal. Thus, it can be seen that the subtractor operational amplifier 133 receives at a first input the transformed integrator output signal waveform 204 present at the field effect transistor terminal 130*e*.

An input terminal 131*a* of an analog gate 131 comprising the amplifier 131*b* and the field effect transistor 131*f* in the subtractor S receives the integrator transfer control signal waveform 202 (FIG. 2) and permits the amplifier 131*b* to energize a control terminal 131*c* of the field effect transistor 131*f*. The control terminal 131*c* of the field effect transistor 131*f* when energized permits the output of the converter C furnished through the buffer amplifier 101 and the conductor 16 to pass from an input terminal 131*d* of the field effect transistor 131*f* to an output terminal 131*e*. As has been previously set forth, the output of the converter C represents the instantaneous frequency of the input signal present at the input terminal 10 to the apparatus A.

An input resistor 133*c* electrically connects the output terminal 131*e* of the field effect transistor 131*f* to a positive input terminal of the subtractor operational amplifier 133. A scaling resistor 133*d* electrically connects the positive input terminal of the amplifier 133 to ground to provide the proper input amplitude for operation of the subtractor operational amplifier 133. The subtractor operational amplifier 133 receives the signal representing the instantaneous frequency of the input signal at the positive input terminal of the amplifier 133, and receives the output signal from the integrator I representing the average frequency of the input signal at the negative input terminal and forms an output signal indicating the difference between the two input signals.

The output signal of the subtractor operational amplifier 133 and the subtractor S, representing the difference between the instantaneous frequency of the input signal and the average frequency of the input signal, is furnished over the conductor 17 to a first input 140*a* and a second input 140*b* of the analog multiplier M in the moment generating network G. The analog multiplier M, of the type well known to those of ordinary skill in the art, performs a multiplication operation and forms an output signal in which amplitude indicates the product of the amplitude of the two analog input signals present at the input terminals 140*a* and 140*b*, and thus multiplies the first statistical moment present on the output conductor 17 by itself in order to square or raise to the second power the first statistical moment of the difference between the instantaneous frequency and the average frequency of the input signal, generating and forming the second statistical moment of such difference.

As has been previously set forth, the second statistical moment generated in the multiplier M is furnished over the electrical conductor 18 to a buffer voltage follower operational amplifier 21 and provided at an output terminal 21*a* for use in oscilloscopes, recorders, or other suitable monitoring instruments for analysis and investigation of statistical characteristics of the input signal.

An input terminal 141*a* of the analog multiplier M–1 receives the output of the multiplier M representing the square of the difference between the instantaneous frequency and the average frequency of the input signal, or the second statistical moment, over the electrical conductor 18*a* as has been previously set forth. An input terminal 141*b* of the analog multiplier M–1 receives the first moment formed in the subtractor S over the conductor 17 and 17*c*. The analog multiplier M–1 performs a multiplying operation on the two analog input signals and generates and forms an analog output signal indicating the cube, or third power of the difference between the instantaneous frequency and the average frequency of the input signal, also known as the third statistical moment of the difference between the input frequency and average frequency of the input signal. The third statistical moment formed in the analog multiplier M–1 is provided over the output conductor 19 to the voltage follower buffer operational amplifier 22. The third statistical moment is accordingly provided at an output terminal 22*a* of the operational amplifier 22 for suitable testing and analytical instrumentation of the type previously set forth.

The analog multiplier M–2 receives the third power or cube of the difference between the instantaneous frequency and average frequency of the input signal at an input terminal 142*a* thereof from the electrical conductor 19*a* as has been previously set forth. An input terminal 142*b* of the analog multiplier M–2 receives the first statistical moment present on the conductor 17. The analog multiplier M–2 multiplies the two analog values present at the input terminals 142*a* and 142*b* and accordingly raises the difference between the instantaneous frequency and average frequency of the input signal to the fourth power, generating and forming the fourth statistical moment of the difference between the instantaneous frequency and average frequency of the input signal. The fourth statistical moment formed in the analog multiplier M–2 is provided over the output conductor 20' to the voltage follower buffer operational amplifier 23, as has been previously set forth, and is present at an output terminal 23*a* for connection to a suitable monitoring and analytical instrument of the type previously set forth.

It should be evident that further analog multipliers connected in a similar arrangement to the analog multipliers M, M–1, and M–2, respectively, may be added to the apparatus A of the present invention in order to form higher order statistical moments, such as the fifth, sixth, and higher in order to provide more accurate and precise analysis and investigation of the input signal waveform being analyzed by the apparatus A of the present invention.

Figure 4:
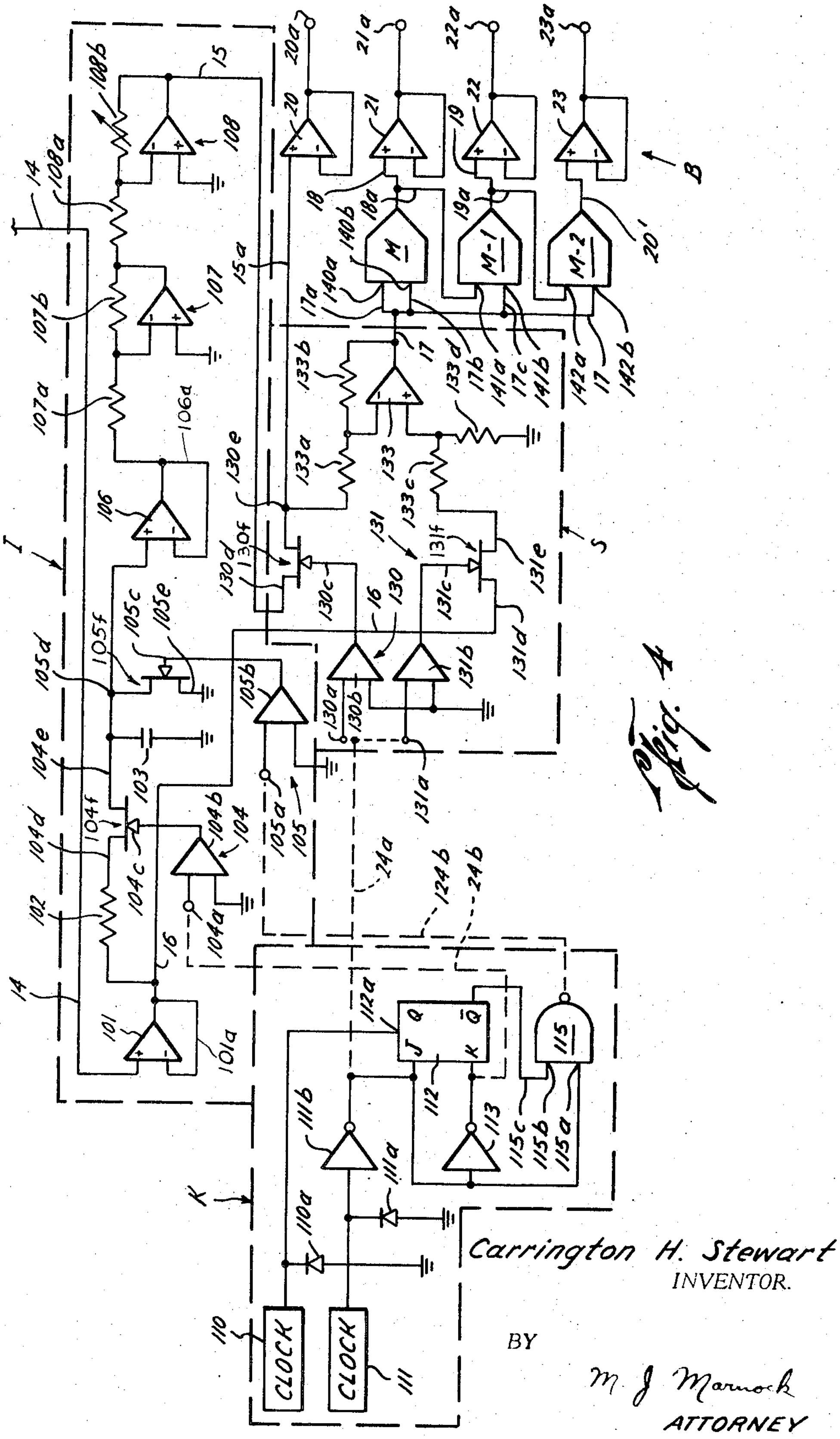

Also, when the input signal is a very rapidly varying signal, further rapid and prompt analysis of the input signal to be analyzed can be realized through the use of an additional arrangement of analog gates and control logic, furnishing input signals to the moment generating network G during alternate half-cycles of the control signal waveforms. Such arrangement would include an additional or duplicate set of analog gates configured as shown in FIG. 4 and having the control drive reversed, with the integrator I further being reset at the opposite half-cycle time of transition of the signal waveforms 201 and 202.

Additionally, by time-shifting the control signal by one-fourth cycle and the integrator reset signal by one-fourth cycle with suitable logic and delay circuits, a third set of analog gates can be used with the present invention. Such gates would provide overlap in the analysis of the input signal during the transitions of the control signal waveforms being furnished to the first and second arrangements of analog gates and provide analysis of the very rapidly varying input signal waveform during the transition and switching intervals of the first and second arrangements of analog gates and control logic. The third set of analog gates would thus provide continuing and overlapping analysis of the input signal waveform at all times.

The foregoing disclosure and description of the invention are illustrative and explanatory thereof, and various changes in the size, shape, materials, wiring connections, and contacts as well as in the details of the illustrated circuitry and construction may be made without departing from the spirit of the invention.

I claim:

1. An apparatus for analysis of a complex aperiodic electrical signal, comprising:
  a. means for sensing the signal;
  b. means for computing the instantaneous frequency of the signal;
  c. means for computing the average frequency of the signal; and
  d. means for generating a statistical moment of the instantaneous frequency of the signal with respect to the average frequency, wherein the signal is analyzed for changes, transitions, and the like.

2. The structure of claim 1, wherein said means for generating comprises:
  means for generating a second statistical moment of the instantaneous frequency of the signal with respect to the average frequency.

3. The structure of claim 1, wherein said means for generating comprises:
  means for generating a third statistical moment of the instantaneous frequency of the signal with respect to the average frequency.

4. The structure of claim 1, wherein said means for generating comprises:
  means for generating a fourth statistical moment of the instantaneous frequency of the signal with respect to the average frequency.

5. The structure of claim 1 wherein:
  a. said means for sensing comprises means for sensing signal level transitions of the input signal; and
  b. said means for computing instantaneous frequency comprises means for forming an output signal whose amplitude indicates the time duration between said signal level transitions of the input signal.

6. The structure of claim 5 wherein said means for computing average frequency comprises:
  integrator means for producing a signal indicating the average amplitude of the output signal from said means for computing instantaneous frequency.

7. The structure of claim 1, wherein said means for generating comprises:
  a. means for determining the difference between the instantaneous frequency and the average frequency of the signal; and
  b. multiplier means for squaring the output of said means for determining, wherein the second statistical moment of the instantaneous frequency is generated.

8. The structure of claim 1, wherein said means for generating comprises:
  a. means for determining the difference between the instantaneous frequency and the average frequency of the signal; and
  b. multiplier means for cubing the output of said means for determining, wherein the third statistical moment of the instantaneous frequency is generated.

9. The structure of claim 1, further including:
  a. means for determining the difference between the instantaneous frequency and the average frequency of the signal; and
  b. multiplier means for generating the fourth power of the output of said means for determining, wherein the fourth statistical moment of the instantaneous frequency is generated.

* * * * *